(12) United States Patent
Wozniak et al.

(10) Patent No.: US 10,778,932 B2
(45) Date of Patent: *Sep. 15, 2020

(54) USER-SPECIFIC VIDEO FRAME BRIGHTNESS FILTER

(71) Applicant: Microsoft Technology Licensing, LLC, Redmond, WA (US)

(72) Inventors: Matthew Richard Wozniak, Bellevue, WA (US); Mehmet Kucukgoz, Seattle, WA (US); Holly Helene Pollock, Woodinville, WA (US); Ian Glen Neal, Ann Arbor, MI (US); Rafael Vincent Prieto Vertido, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,578

(22) Filed: Dec. 5, 2018

(65) Prior Publication Data

US 2020/0186744 A1  Jun. 11, 2020

(51) Int. Cl.
*H04N 5/57* (2006.01)
*H04N 5/44* (2011.01)

(52) U.S. Cl.
CPC ............. *H04N 5/57* (2013.01); *H04N 5/4403* (2013.01)

(58) Field of Classification Search
CPC .......................... H04N 5/2354; H04N 5/2351
See application file for complete search history.

(56) References Cited

U.S. PATENT DOCUMENTS 7,744,216 B1   6/2010  Uhlhorn
8,605,017 B2 * 12/2013  Brown Elliott ... G02F 1/133621
                                                              345/102

(Continued)

FOREIGN PATENT DOCUMENTS

EP    3035681 A1    6/2016
WO   2018042721 A1   3/2018

OTHER PUBLICATIONS

"Non Final Office Action Issued in U.S. Appl. No. 16/210,667", dated Sep. 26, 2019, 19 Pages.

(Continued)

*Primary Examiner* — Paulos M Natnael
(74) *Attorney, Agent, or Firm* — Alleman Hall Creasman & Tuttle LLP

(57) ABSTRACT

A computing device is configured to selectively adjust a brightness of a video based on a user-specific response to light. A user-specific light response parameter is determined. For each frame of a plurality of frames included in the video, (1) a brightness characterization for the frame is determined, (2) one or more additional brightness characterizations for one or more additional frames of the plurality of frames is determined, (3) a filter for the frame is generated based on the brightness characterization, the one or more additional brightness characterizations, and the user-specific light response parameter, (4) the filter is applied to the frame to generate a filtered frame, and (5) the filtered frame is output by the computing device. The filter is configured such that if a high brightness condition is present in the frame, then the high brightness condition is mitigated or removed from the filtered frame.

20 Claims, 9 Drawing Sheets

(56) References Cited

U.S. PATENT DOCUMENTS

| | | | |
|---|---|---|---|
| 9,479,695 B2* | 10/2016 | Lim | H04N 5/23229 |
| 9,900,967 B2* | 2/2018 | Isaacs | H05B 47/175 |
| 10,168,879 B1 | 1/2019 | Duan et al. | |
| 2004/0017944 A1 | 1/2004 | Ding et al. | |
| 2006/0268180 A1 | 11/2006 | Chou | |
| 2007/0132865 A1 | 6/2007 | Adams et al. | |
| 2008/0122813 A1* | 5/2008 | Kim | G09G 3/3648 345/204 |
| 2009/0174638 A1* | 7/2009 | Brown Elliott | G02F 1/133621 345/88 |
| 2009/0324074 A1 | 12/2009 | Dembo | |
| 2010/0085361 A1 | 4/2010 | Kim et al. | |
| 2011/0109743 A1 | 5/2011 | Kuehnle et al. | |
| 2012/0114264 A1 | 5/2012 | Shmunk et al. | |
| 2012/0182333 A1 | 7/2012 | Baba et al. | |
| 2013/0076874 A1 | 3/2013 | Mentz et al. | |
| 2013/0093802 A1 | 4/2013 | Tanaka | |
| 2013/0129214 A1 | 5/2013 | Toda | |
| 2013/0187958 A1 | 7/2013 | Kimpe et al. | |
| 2013/0286245 A1 | 10/2013 | Samadani | |
| 2013/0336445 A1 | 12/2013 | Sehnert et al. | |
| 2016/0110846 A1 | 4/2016 | Park et al. | |
| 2016/0148414 A1 | 5/2016 | Itani et al. | |
| 2016/0234455 A1 | 8/2016 | Thompson et al. | |
| 2017/0039967 A1 | 2/2017 | Jung et al. | |
| 2017/0200296 A1 | 7/2017 | Jones et al. | |
| 2017/0365101 A1* | 12/2017 | Samec | G02B 27/017 |
| 2018/0160993 A9 | 6/2018 | Lee et al. | |
| 2018/0288382 A1 | 10/2018 | Kring | |
| 2020/0184247 A1 | 6/2020 | Wozniak et al. | |
| 2020/0186764 A1 | 6/2020 | Wozniak et al. | |

OTHER PUBLICATIONS

"Final Office Action Issued in U.S. Appl. No. 16/210,667", dated Mar. 9, 2020, 20 Pages.

"International Search Report and Written Opinion issued in PCT Application No. PCT/US19/063133", dated Mar. 17, 2020, 14 Pages.

"International Search Report and Written Opinion issued in PCT Application No. PCT/US19/063134", dated Mar. 16, 2020, 13 Pages.

"International Search Report and Written Opinion issued in PCT Application No. PCT/US19/063481", dated Mar. 23, 2020, 16 Pages.

"Non Final Office Action Issued in U.S. Appl. No. 16/210,380", dated May 1, 2020, 9 Pages.

"Non Final Office Action Issued in U.S. Appl. No. 16/210,667", dated Jun. 22, 2020, 19 Pages.

* cited by examiner

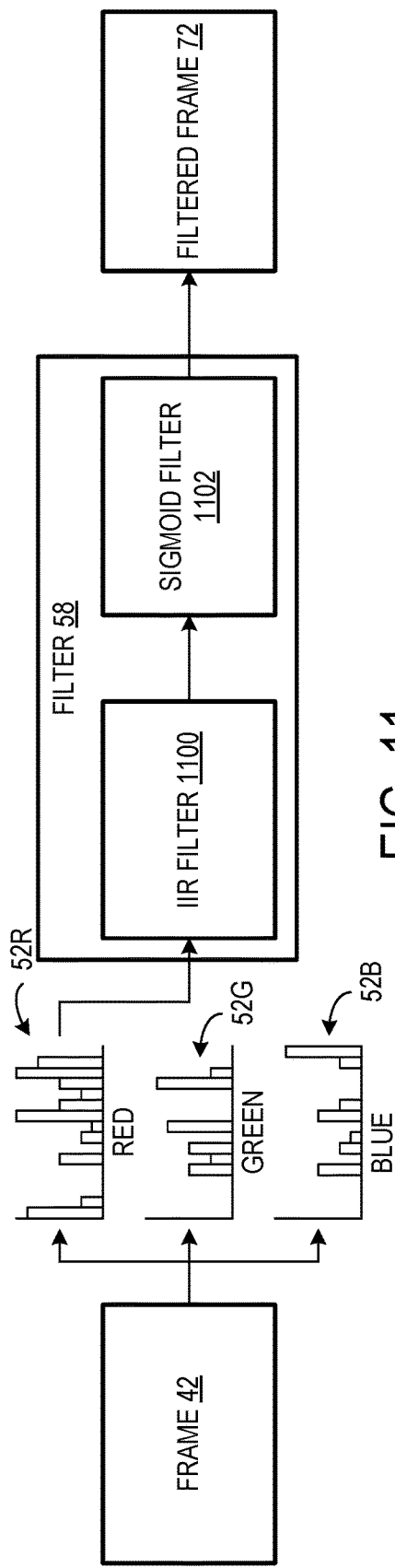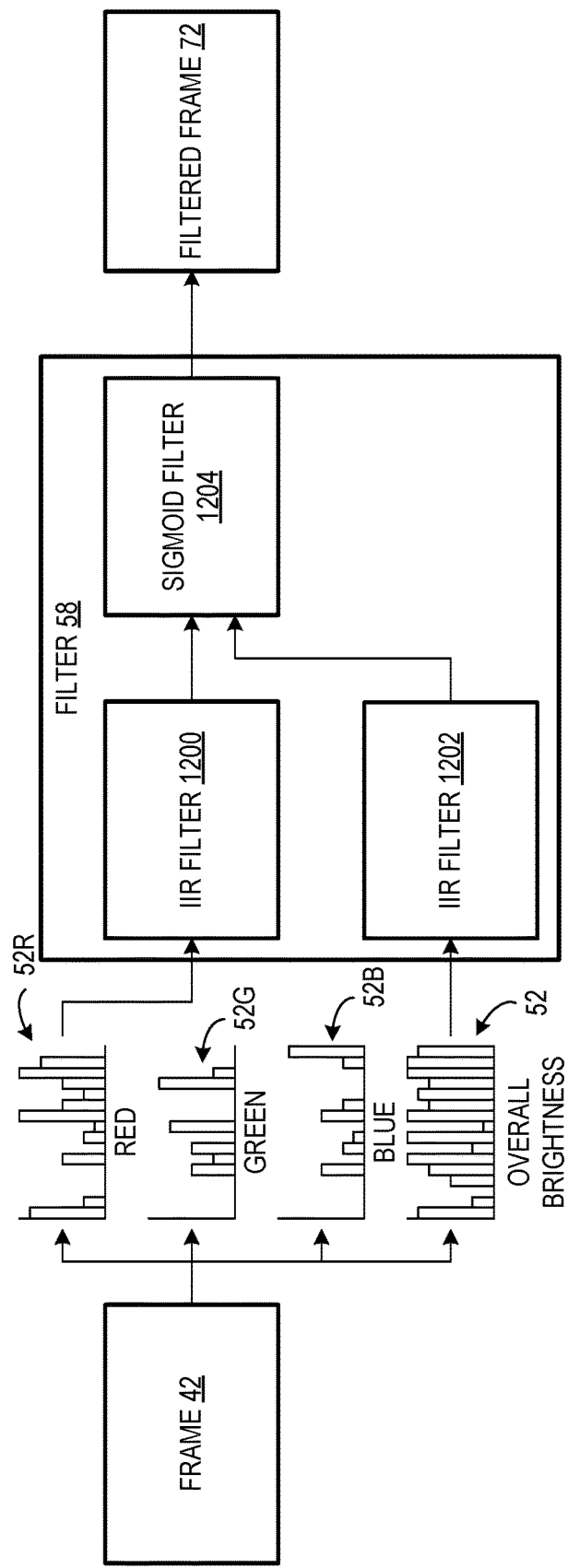

USER-SPECIFIC VIDEO FRAME BRIGHTNESS FILTER

BACKGROUND

Some users of display devices are sensitive to bright light and/or to sudden changes in brightness. When these users watch videos or other frame-based image content, the eyes may be irritated by some portions of the video. Past solutions have included dimming the entire video, however this may lower contrast and make it difficult to notice detail in dark frames of the video.

SUMMARY

A computing device is configured to adjust a brightness of a video based on a user-specific brightness response. A user-specific light response parameter is determined. For each frame of a plurality of frames included in the video, (1) a brightness characterization for at least a region of interest in the frame is determined, (2) one or more additional brightness characterizations for at least the region of interest in one or more additional frames of the plurality of frames is determined, (3) a filter for the frame is generated based on the brightness characterization, the one or more additional brightness characterizations, and the user-specific light response parameter, (4) the filter is applied to at least the region of interest in the frame to generate a filtered frame, and (5) the filtered frame is output by the computing device. The filter is configured such that if a high brightness condition is present in the region of interest in the frame, then the high brightness condition is mitigated or removed from the region of interest in the filtered frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 11 schematically shows an example color-specific brightness filter.

FIG. 12 schematically shows an example combination color-specific brightness and overall brightness filter.

DETAILED DESCRIPTION

Figure 1:
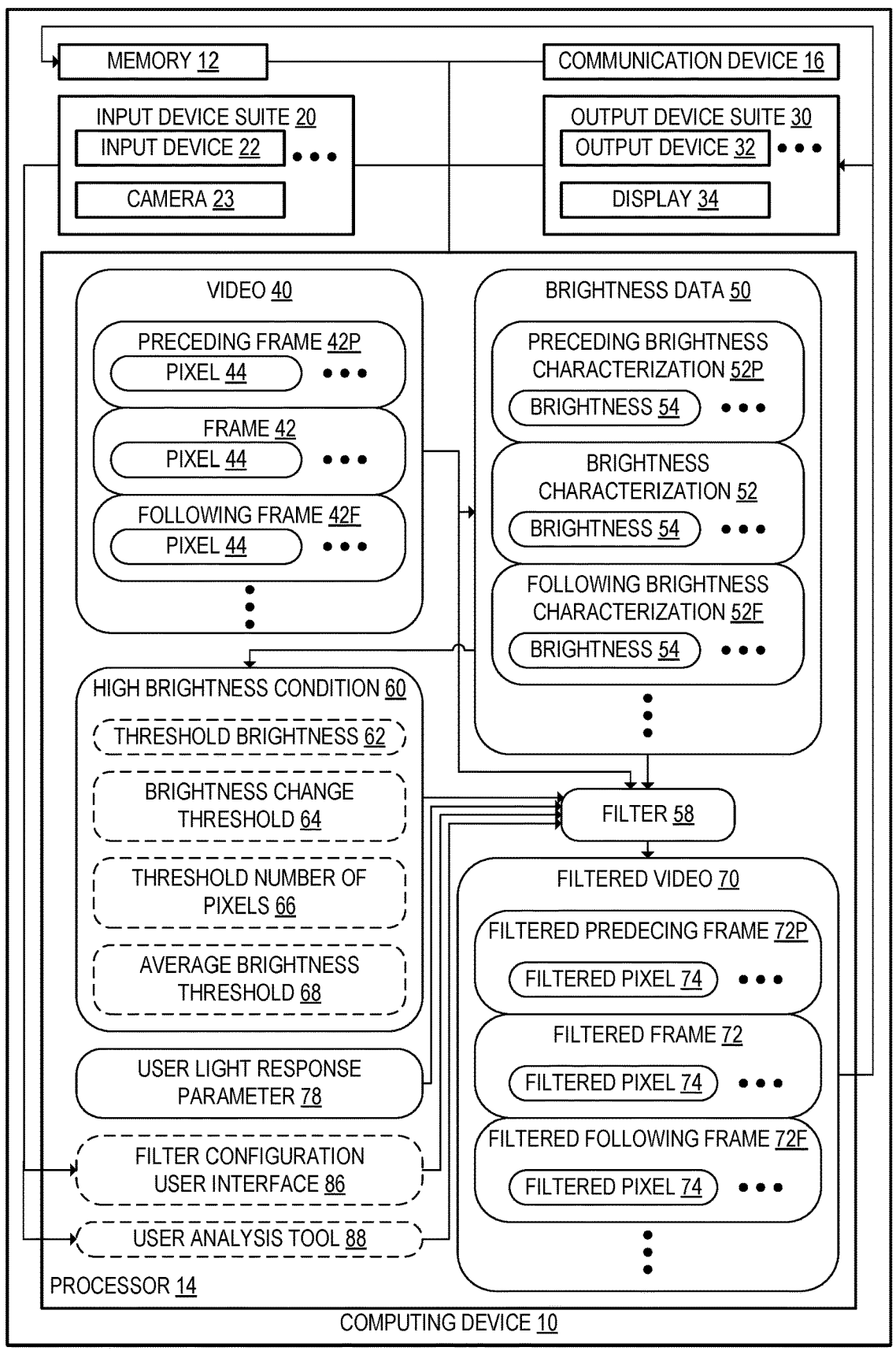
FIG. 1 schematically shows an example computing device.

As discussed above, uniformly dimming an entire video for a person having light sensitivity may cause a reduction in contrast and detail of the video. This problem is particularly apparent when the video is watched both by a user whose eyes are sensitive and by a user whose eyes are not sensitive. A video that is dark enough for a user whose eyes are sensitive may be too dark for a user whose eyes are not sensitive.

Accordingly, the present description is directed to an approach for filtering a video such that a resulting filtered video has one or more of the following characteristics 1) an overall brightness of each frame of a plurality of frames included in the filtered video is restricted to be less than a maximum threshold brightness, 2) a change in brightness over a plurality of frames included in the filtered video is restricted to be less than a brightness change threshold, and 3) no region within any given frame of a plurality of frames included in the filtered video has a brightness greater than the maximum threshold brightness. The filtered video may cause less discomfort to a user with light sensitivity by eliminating high brightness frames and/or high brightness regions within frames—e.g., high brightness point light sources, as well as not transitioning between dark and bright frames too quickly. Moreover, the filtered video may still have high contrast that preserves detail in darker frames such that the filtered video may look substantially normal to a user that does not have light sensitivity.

Furthermore, different users may have different levels and/or types of brightness sensitivity. Accordingly, in some implementations, a video optionally may be filtered based on a user-specific light response parameter that differs from user to user. The present description contemplates various intelligent approaches for determining a user-specific light response parameter and tuning a filter based on a determined user-specific light response parameter such that a video may be suitably filtered according to a particular level and/or type of light sensitivity of a particular user.

Furthermore, in some cases, a user may have brightness sensitivity that is specific to one or more particular colors of light. Accordingly, in some implementations, a video optionally may be filtered to generate a filtered video having one or more of the following characteristics 1) a color-specific brightness of each frame of a plurality of frames included in the filtered video is restricted to be less than a maximum color-specific threshold brightness, 2) a change in color-specific brightness over a plurality of frames included in the filtered video is restricted to be less than a brightness change threshold, and 3) no region within any given frame of a plurality of frames included in the filtered video has a color-specific brightness greater than the maximum color-specific threshold brightness. It will be appreciated that such color-specific filtering may be performed alone or in combination with overall brightness filtering depending on the particular level and/or type of light sensitivity of a particular user.

FIG. 1 shows an example computing device 10 configured to perform the video filtering techniques described herein. The computing device 10 may include memory 12 and a processor 14 operatively coupled to the memory 12. The computing device 10 may further include an input device suite 20 including one or more input devices 22, which may be operatively coupled to the processor 14 and/or the memory 12. For example, the one or more input devices 22 may include one or more of a touchscreen, a trackpad, a keyboard, a mouse, one or more buttons, a microphone, one or more position sensors, and/or one or more other input devices 22. The input device suite 20 may include a camera 23. The camera 23 may be configured to image a user of the computing device 10. In some examples, the camera may be an infrared, color, stereoscopic, and/or depth camera for machine vision and/or gesture recognition of the user. The computing device 10 may further include an output device suite 30 including one or more output devices 32. The output device suite 30 may include a display 34. The display 34 may take any suitable form. In some examples, the display 34 may be a large format display. In some examples, the display 34 and the computing device 10 have a shared enclosure. In some examples, the display 34 may be a near-eye display, such as a virtual reality head-mounted display or a see-through augmented reality display. Other output devices 32, such as one or more speakers and/or haptic feedback devices, may also be included in the output device suite 30. The computing device 10 may further include one or more communication devices 16 via which the computing device 10 may communicate with one or more other computing devices. In some implementations, one or more functions of at least one of the memory 12, processor 14, one or more input devices 22, and/or one or more output devices 32 may be offloaded to the one or more other computing devices.

The processor 14 may be configured to receive a video 40. In some examples, the video 40 may be stored as a video file in the memory 12 or another data storage device. Alternatively, the video 40 may be streamed via the one or more communication devices 16 and processed as it is received at the computing device 10. The video 40 may include a plurality of frames 42, each frame 42 including a plurality of pixels 44. The processor 14 may be configured to perform brightness adjustment on each frame 42 of a plurality of frames 42 included in the video 40. In some examples, the processor 14 may be configured to perform brightness adjustment on the entire video 40, whereas in other examples, the processor 14 may be configured to perform brightness adjustment on only a subset of the frames 42 included in the video 40. In addition, for each frame 42, in some examples, the processor 14 may be configured to perform brightness adjustment on the entire frame 42. In other examples, the processor 14 may be configured to perform brightness adjustment only on a region of interest in the frame 42 and/or on certain pixels regardless of whether they constitute a specific region. Though repeated reference will be made throughout to "video," it will be appreciated that the disclosed systems and methods are often applicable to scenarios involving as few as 2-3 temporally adjacent image frames.

Figure 2:
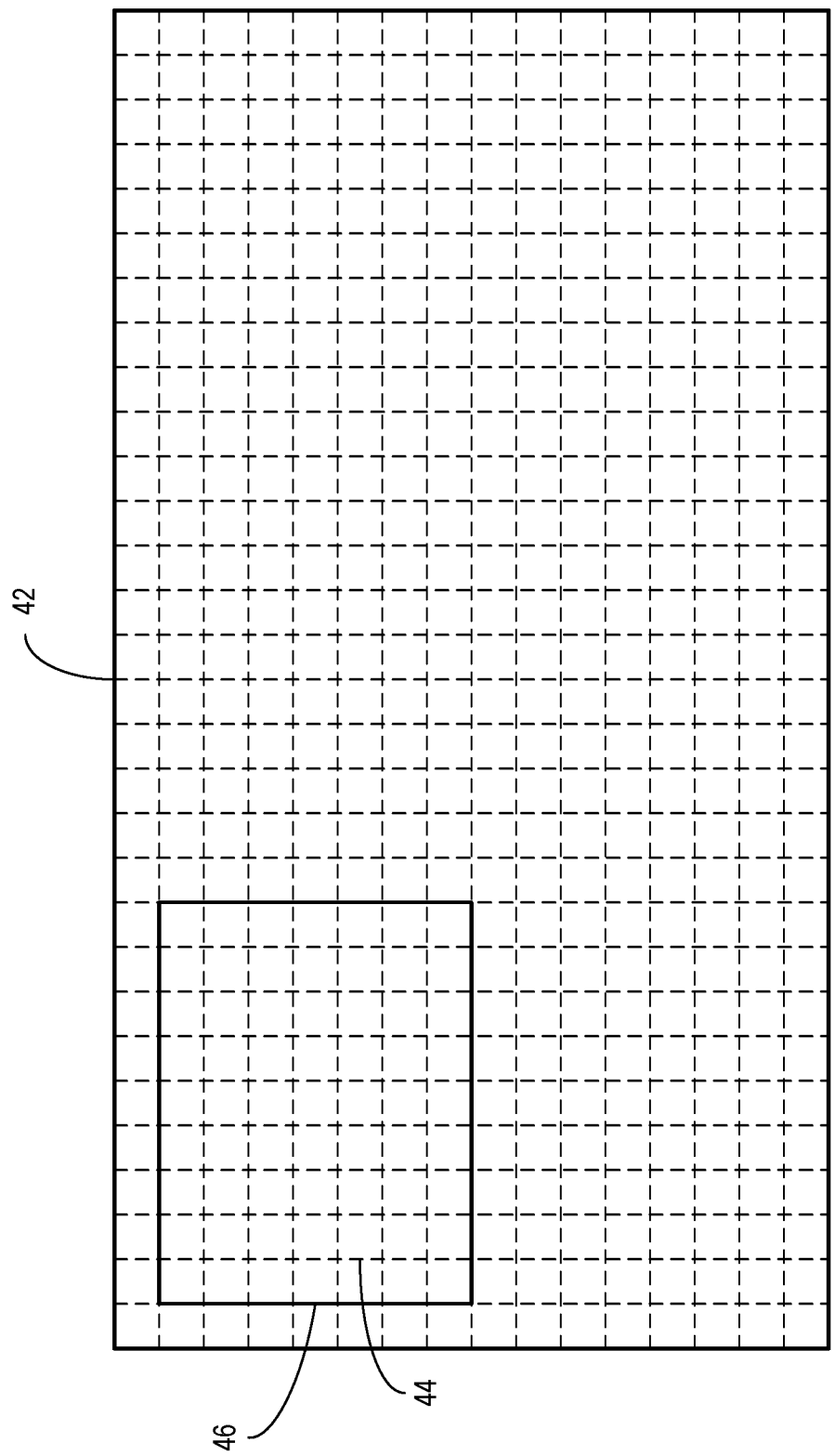
FIG. 2 schematically shows an example frame of a video.

FIG. 2 shows an example frame 42 including a plurality of pixels 44. In the depicted example, the frame includes thirty columns and twenty rows of pixels. However, the frame may include any suitable number of pixels. The frame 42 shown in FIG. 2 includes a region of interest 46 including a plurality of pixels 44. In the depicted example, the region of interest includes nine columns and seven rows of pixels. However, the region of interest may include any suitable number of pixels. Although the region of interest 46 is rectangular in the implementation of FIG. 2, the region of interest 46 may have other shapes in other examples. In some examples, the region of interest 46 may be the entire frame 42. In another example, the frame 42 may be divided into six to eight regions of interest, or any other suitable number of sub-frame regions. For example, these numbers of regions may be suitable for identifying and mitigating high brightness point light sources within the frame 42.

Figure 3:
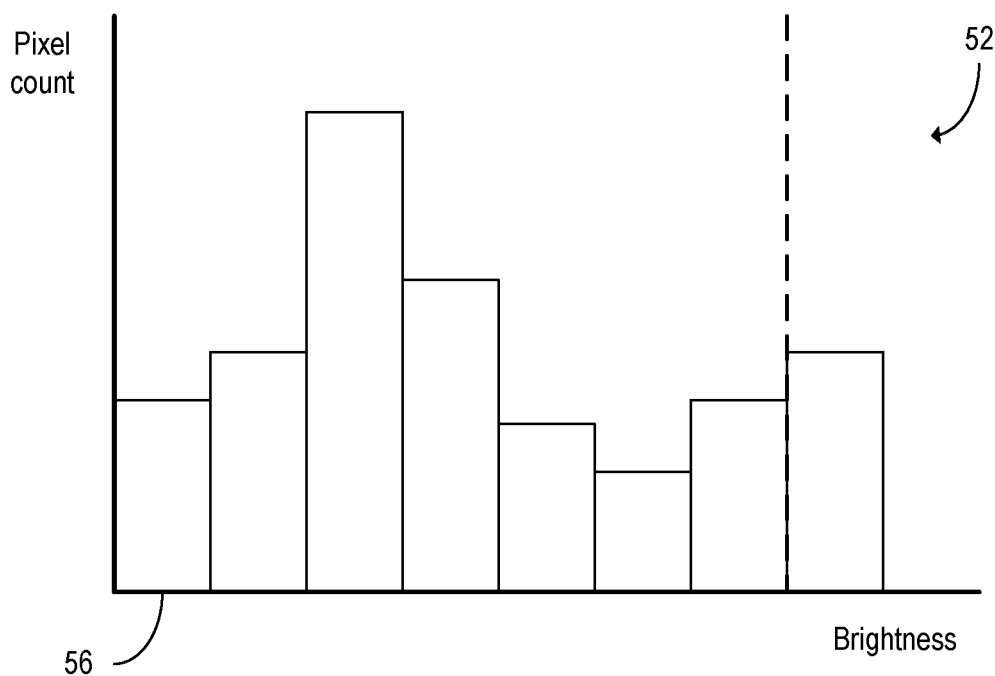
FIG. 3 shows an example brightness characterization of a frame of a video.

Each pixel 44 of the plurality of pixels 44 included in the frame 42 may have a respective brightness 54. The processor 14 may be further configured to extract brightness data 50 from the frame 42 related to the brightness 54 of the pixels 44 included in the region of interest 46. In some implementations, the processor 14 may be configured to determine a brightness characterization 52 for at least the region of interest 46 of the frame 42. FIG. 3 shows an example brightness characterization 52 in the form of a brightness distribution for a region of interest 46. The brightness distribution includes a plurality of brightness ranges 56. For each brightness range 56 of the plurality of brightness ranges 56, the brightness characterization 52 may indicate a number of pixels 44 in the region of interest 46 having brightness 54 within that brightness range 56. In some implementations, the brightness characterization 52 may include a brightness range 56 for each brightness 54 the pixels 44 are capable of having. In other implementations, the processor 14 may be configured to bin the pixels 44 into a smaller number of brightness ranges 56. In some implementations, the brightness characterization 52 may include one or more parameters derived from the brightness distribution that characterize the brightness of the frame. In one example, the brightness characterization 52 may include a threshold brightness defined as a highest brightness of a number of pixels exceeding a threshold number of pixels. In some implementations, the brightness characterization 52 may include an average brightness of pixels in the frame. In some implementations, the brightness characterization 52 may include an average brightness of a brightest region of a frame. In other implementations, the brightness characterization 52 may include another parameter that characterizes at least a region of a frame.

In the depicted example, the brightness characterization 52 is a brightness distribution visually represented as a histogram. It will be appreciated that the brightness characterization may take any other suitable form. In some implementations, the brightness characterization may take the form of a clustering analysis of the frame 42. In one example, the processor 14 may be configured to perform K-means clustering analysis on the frame 42 to identify different groups of pixels having different brightness levels. For example, such clustering analysis may provide spatial information about brightness in the frame that may be used to identify and mitigate high brightness point light sources.

Returning to FIG. 1, the processor 14 may be further configured to determine one or more additional brightness characterizations 52 for at least the region of interest 46 in one or more additional frames of the plurality of frames 42. Such multi-frame characterizations permit an understanding of frame-to-frame brightness variations. In some implementations, the one or more additional frames may be one or more following frames 42F that immediately follow the frame 42 in the video 40. For example, the one or more additional frames may be two following frames 42F. In other implementations, the one or more additional frames may include one or more preceding frames 42P that immediately precede the frame 42.

In some implementations, the number of additional frames for which the brightness characterizations are determined and the corresponding brightness information used to inform the filtering process may depend on the application and/or type of video. For example, a video stored as a video file may consider a larger number of following frames (e.g., 6-8 frames in advance) in the filtering process, because the entire video is available for processing. As another example, a streaming video or video game may consider a smaller number of following frames (e.g., 1-2 frames in advance) in the filtering process, because such frames may not be received, generated, or otherwise available for processing. In some such implementations, a streaming video/video game may be buffered by a suitable number of frames prior to output in order to have a suitable number of following frames available for use in filtering.

The processor 14 may be configured to generate a filter 58 for the frame 42. The filter 58 may be configured to change the brightness of one or more pixels 44 in the region of interest 46 in order to mitigate a high brightness condition 60 in the region of interest in the frame 42. The brightness characterization 52 of the frame 42 may indicate or suggest whether a high brightness condition is present in the frame 42. As one example, the high brightness condition 60 may be a condition in which each of a plurality of pixels 44 in the region of interest 46 exceeding a threshold number of pixels 66 has a respective brightness 54 exceeding a threshold brightness 62. The threshold number of pixels 66 may be employed to ensure that the high brightness condition characterizes a suitable portion of the region of interest (thus corresponding with potential for causing discomfort). For example, the threshold number of pixels 66 may be equivalent to twenty percent of the region of interest. The threshold brightness 62 may, for example, be adjustable via user input received from the one or more input devices 22. Additionally or alternatively, the threshold number of pixels 66 may be adjustable via user input in some implementations. In some implementations, user characteristics and/or behavior may be observed to infer user preferences, and such thresholds may be adjusted based on the inferred user preferences.

In other implementations, the high brightness condition 60 may be a condition in which an average brightness of the region of interest 46 exceeds an average brightness threshold 68—e.g., a bright point source potentially causing discomfort. The average brightness of the region of interest 46 may be a mean brightness or a median brightness. Similarly to the threshold brightness 62 and the threshold number of pixels 66, the average brightness threshold 68 may be adjustable via user input or inferred from user behavior in some implementations.

In some implementations, the high brightness condition 60 may be a condition in which a change in brightness across multiple consecutive frames 42 is greater than a brightness change threshold 64. In such implementations, the processor 14 may be configured to determine the threshold brightness 62 based at least in part on the one or more additional brightness characterizations. The one or more additional brightness characterizations may include one or more preceding brightness characterizations 52P and/or one or more following brightness characterizations 52F.

In implementations in which the high brightness condition 60 is a condition in which an average brightness of the region of interest 46 exceeds an average brightness threshold 68, the brightness change threshold 64 may be a threshold amount of change in the average brightness of the region of interest 46.

In implementations in which the high brightness condition 60 is a condition in which each of a plurality of pixels 44 in the region of interest 46 exceeding a threshold number of pixels 66 has a respective brightness 54 exceeding a threshold brightness 62, the brightness change threshold 64 may be a threshold difference between the brightness 54 of a pixel 44 in the frame 42 and the brightness 54 of the pixel 44 in the preceding frame 42P. In such implementations, when a number of pixels 44 greater than the threshold number of pixels 66 changes in brightness 54 by an amount exceeding the brightness change threshold 64, the high brightness condition 60 is present in the frame. In such implementations, the threshold brightness 62 may be dynamically adjusted to avoid exceeding the brightness change threshold 64. It will be appreciated that the high brightness condition may take any suitable form that would cause discomfort to a user that has a sensitivity to bright light.

In some examples, the filter 58 may be configured to change a brightness of some or all pixels in the region of interest 46 of the frame. In some examples, the filter 58 may be configured to, for one or more pixels 44 in the region of interest 46, not change the brightness of those pixels. In some examples, the change in brightness may be nonuniform between pixels over the region of interest 46. Thus, rather than uniformly darkening each pixel 44 in the region of interest 46 by the same amount, the processor 14 may be configured to apply different changes in brightness to different pixels 44 via filtering.

The filter 58 may be characterized by a difference equation that calculates a dynamic brightness threshold for the current frame being filtered. The difference equation may include terms that are influenced by coefficients that are determined based on the brightness data 50. More particularly, coefficients of the difference equation may be determined based on the brightness characterization 52 of the region of interest 46 in the frame 42, and the brightness characterization 52 of the region of the interest in one or more additional frames (e.g., one or more preceding frames 42P and/or one or more following frames 42F).

The difference equation that characterizes the filter 58 may include additional terms and/or coefficients based on other factors that influence the filter. For example, the difference equation may include one or more terms that are determined based on a user light response parameter 78. The user light response parameter 78 may influence how aggressive the filter 58 changes pixel brightness over a plurality of frames of the video. In some examples, the user light response parameter 78 may be predetermined, e.g., for an average light-sensitive user. In other examples, the user light response parameter 78 may be a user-specific light response parameter that is customized for a user, and in some cases dynamically determined as video is being played. In one example, the user light response parameter 78 is a pupil response parameter. More particularly, the pupil response parameter may be a pupil dilation rate in response to a particular stimulus. Although other user light response parameters may be used to tune the filter 58 in other examples.

In some implementations, the difference equation that characterizes the filter 58 may include terms that cause the filter to change different color-specific brightnesses differently. For example, if a user has general light sensitivity, and is also particularly sensitive to the color red, then the difference equation may include terms that mediate the overall brightness of the frames as well as additional terms that further mediate the red color channel of the frame to further dim bright red pixels in the frame.

In some implementations, the filter 58 may include an infinite impulse response filter. The infinite impulse response filter may be tuned such that an overall brightness of a filtered frame is restricted to be less than the brightness threshold 62, and a change in brightness over a plurality of consecutive frames including the filtered frames is restricted to be less than the brightness change threshold 64. Example code implementing the filter 58 as an infinite impulse response filter is provided below:

```
p - previous avg
mp - previous max
c - current avg
mc - current max
duration - video frame duration
maxLumChange - change rate (based on dilation response)
delta = abs(p-c)
pc = p <= 0.f ? delta / THRESHOLD : delta / p
float x = 0.f;
    float y = 1.f;
    if (duration > 0.f && delta > 0.f)
    {
        float durationScale = duration / (100.f / 3.f);
        float deviation = exp(1.4f * abs(min(mc,mp) - c)) - 1.f;
        float dampen = min(1.f, exp( (1.f / .2f) * (delta +
MIN_UNORM_VALUE)) - 1.f);
        float pointLightScale = deviation / dampen;
        y = (maxLumChange * durationScale * pointLightScale);
        y = clamp(y, 0.f, 1.f);
        x = 1.f - y;
    }
    // Infinite Impulse Response (HR) filter.
    float a0 = 1.f - x;
    float b1 = x;
    desired = (a0 * c) + (b1 * p);
    if (desired > c || c < 0.1)
    {
        desired = c;
    }
```

In this example code, p is the average brightness of the preceding frame, mp is the maximum brightness of the preceding frame, c is the average brightness of the current frame 42, mc is the maximum brightness of the current frame 42, duration is the duration of a frame 42, maxLumChange is the brightness change threshold 64, and x and y are coefficients of the infinite impulse response filter.

In other implementations, the filter 58 may include a finite impulse response filter. A finite impulse response filter may be used, for example, when the video 40 is a video file stored in the memory 12 of the computing device 10 rather than a streamed video or a video game video. In implementations in which the filter 58 is a finite impulse response filter, the one or more additional frames may include a plurality of preceding frames 42P and a plurality of following frames 42F.

Figure 4:
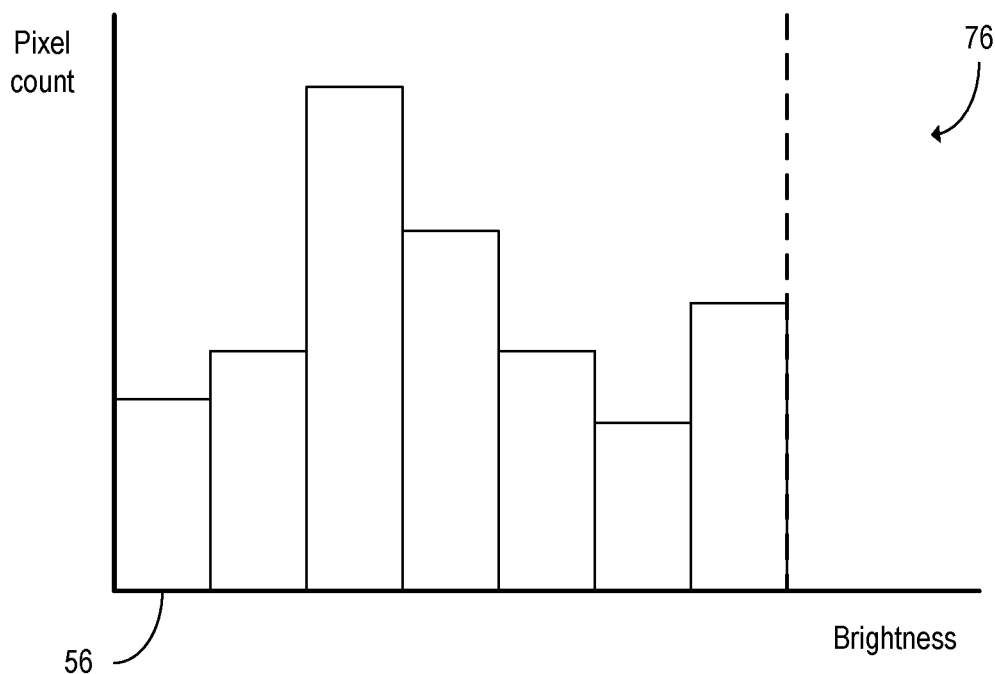
FIG. 4 shows an example brightness characterization of a filtered frame of video.

After generating the filter 58, the processor 14 may be configured to apply the filter 58 to at least the region of interest 46 of the frame 42 to generate a filtered frame 72, which may be included in a filtered video 70. FIG. 4 shows a filtered brightness distribution 76 for the region of interest 46 of the filtered frame 72. The high brightness condition 60 is not present in the region of interest 46 of the filtered frame 72. In particular, a brightness of pixels greater than the threshold brightness 62 are reduced to a brightness below the threshold. In other words, in terms of the depicted brightness distribution 76, the pixels in the bin above the threshold brightness 62 shown in the unfiltered frame of FIG. 3 are redistributed by the filtering process to different bins below the threshold brightness 62 in the filtered frame of FIG. 4.

In some examples, the number of filtered pixels 74 with respective filtered brightness above the threshold brightness 62 may be below the threshold number of pixels 66. For example, for a number of filtered pixels 74 in the region of interest 46 of the filtered frame 72 less than the threshold number of pixels 66, a respective filtered brightness may differ by an amount greater than the brightness change threshold 64 from the brightness 54 of that pixel 44 in the preceding frame 42P and/or the following frame 42F. In other implementations, the average brightness of the region of interest 46 of the filtered frame 72 may be below the average brightness threshold 68. Thus, the rate at which the brightness of the region of interest 46 changes as the video 40 plays may be reduced so as to give the user's eyes more time to adjust to the change in brightness.

Figure 5:
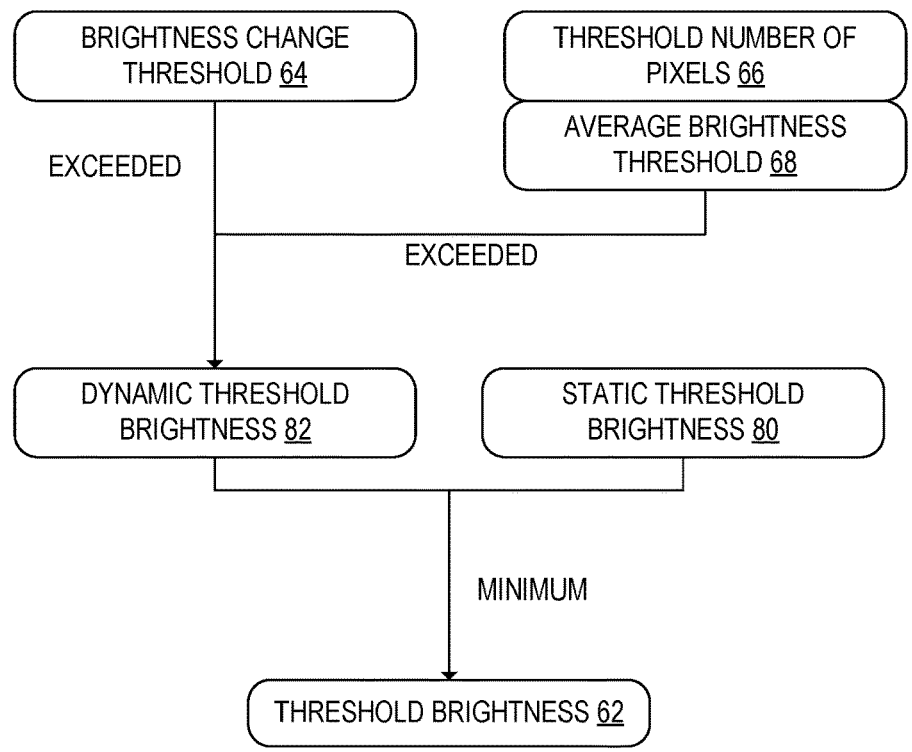
FIG. 5 schematically shows an example determination of a brightness threshold.

As discussed above, in some implementations, the processor 14 may be further configured to determine the threshold brightness 62 based at least in part on the brightness change threshold 64. In such implementations, when a number of pixels 44 in the region of interest 46 exceeding the threshold number of pixels 66 would exceed the brightness change threshold 64 relative to the preceding frame 42P, the filter 58 may restrict the increase in the respective brightness of the pixels 44 to an amount less than or equal to the brightness change threshold 64. As shown in FIG. 5, the threshold brightness 62 may be expressed as the lower of a static threshold brightness 80 and a dynamic threshold brightness 82. The static threshold brightness 80 may be set by the user via user input or may be a default value. The dynamic threshold brightness 82 may be output by the filter 58 as a product of the filtering process. In some examples, the dynamic threshold brightness may be the threshold used when the brightness change threshold 64 would be exceeded. Thus, the brightness change threshold 64 may be dynamically adjusted such that the brightness 54 of the region of interest 46 does not change more quickly than would be comfortable for the user.

In some implementations, the filter 58 may be a multi-stage filter configured to apply additional mediation and/or smoothing operations to the frame. In one example, the filter 58 may be configured to apply a sigmoid function having an upper bound corresponding to the threshold brightness 62 to the frame. In one example, the sigmoid function is applied to the frame after the IIR filter is applied to the frame to determine the threshold brightness 62. For example, the filter 58 may multiply the respective brightness 54 of each pixel 44 in the region of interest 46 by the sigmoid function. Example code implementing a sigmoid function to modify brightness is provided below:

```
float sigmoid(float x, float maxBrightness)
{
    float rate = log(255.f*exp(5.5f)* maxBrightness - exp(5.5f)) /
    maxBrightness;
    float offset = log(maxBrightness / (1 - maxBrightness));
    return (maxBrightness * exp((rate * x) - offset)) / (1 + exp((rate *
    x) - offset));
}
```

Figure 6:
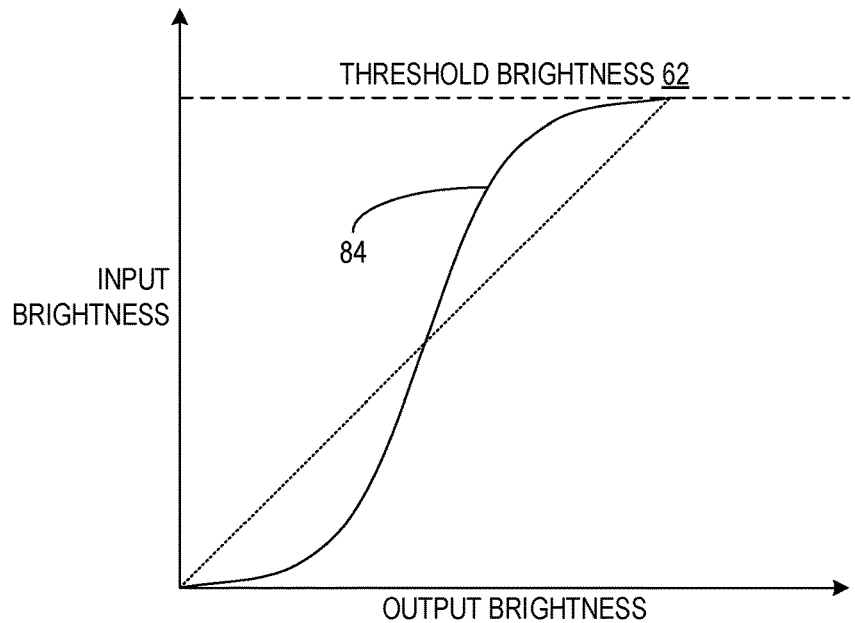
FIG. 6 shows an example sigmoid curve representative of a sigmoid function that may be applied to a frame as part of a filtering process.

An example sigmoid curve 84 visually representing a sigmoid function that may be applied to a frame as part of the filtering process is shown in FIG. 6. The upper bound of the sigmoid curve 84 is the brightness threshold 62. The dotted line shows a one-to-one correspondence between input brightness and output brightness and provides a reference of how brightness changes along the sigmoid curve. For example, in the lower region of the sigmoid curve 84, the output brightness of some pixels is increased relative to the input brightness of those pixels. In the upper region of the sigmoid curve 84, the output brightness of some pixels is degreased relative to the input brightness of those pixels. The sigmoid function may have the effect of smoothing the brightness of the pixels such that the filtered frame does not appear to be clipped while also preserving detail of the darker features in the frame.

After the filtered frame 72 is generated, the processor 14 may be further configured to output the filtered frame 72. In some examples, the filtered frame 72 may be output to memory 12 and stored as a video file. In some examples, the filtered frame 72 may be output for display at the display 34 of the computing device 10. In some examples, the filtered frame 72 may be output to another filtering or image processing component of the computing device 10 for additional processing of the filtered frame 72.

The filtered frame 72 may be output as part of a filtered video 70. Note that each filtered frame of the filtered video 70 may be filtered by a different filter 58 that is generated based on different brightness data 50 that is specific to the particular frame (and in relation to preceding and following frames) that may differ from other frames in the video 40. In some implementations where the filter 58 is applied to a particular region of interest selected from a plurality of regions in the frame 42, a different filter may be generated for each region of the plurality of regions based on a brightness characterization of that region. For example, different regions of a frame may be filtered separately to mitigate a high brightness within the region, such as a high brightness point light source without disproportionately affecting other less bright regions of the frame.

As discussed above, different users may have different levels and/or types of brightness sensitivity. Accordingly, in some implementations, a video optionally may be filtered based on a user-specific light response parameter that differs from user to user. In some implementations, the computing device 10 may be configured to perform various intelligent approaches for determining a user-specific light response parameter 78 and tuning the filter 58 based on the determined user-specific light response parameter such that the video 40 may be suitably filtered according to a particular level and/or type of light sensitivity of a particular user. As discussed above, the response parameter may be tuned in recognition of the sensitivity of a user. Specifically, a response parameter may be tuned to provide a relatively more or less aggressive filter response, so as to control level and rate of brightness change over successive frames of video.

Figure 7:
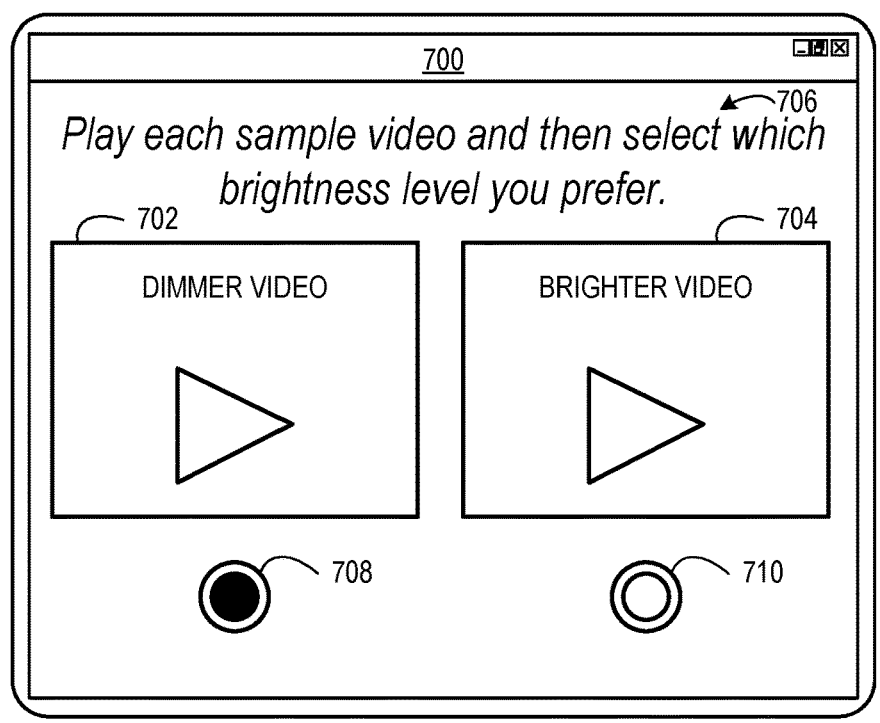
FIG. 7 schematically shows an example graphical user interface including sample videos having different brightness characteristics.
Figure 8:
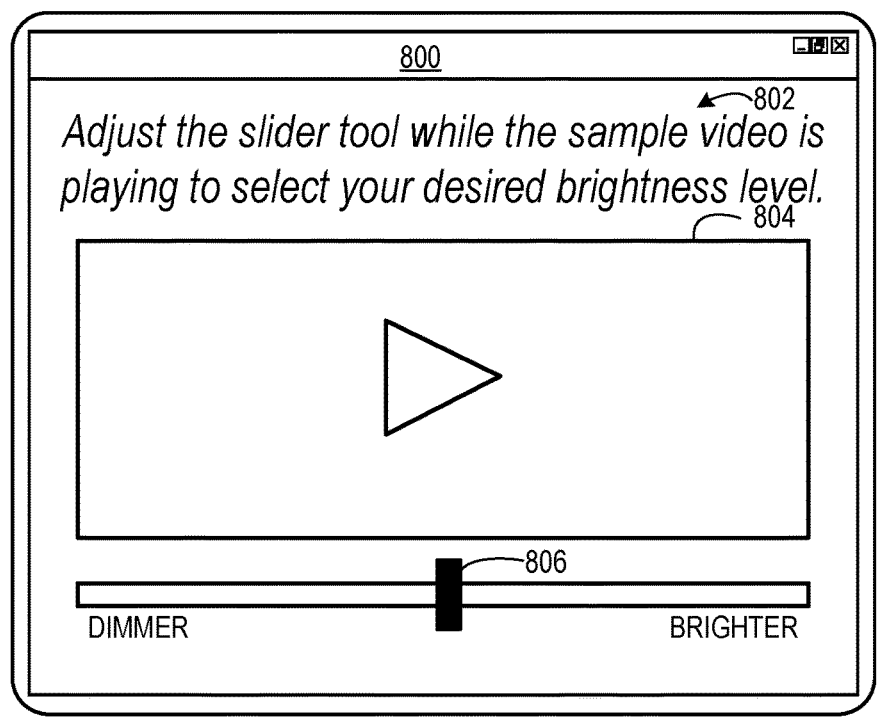
FIG. 8 schematically shows an example graphical user interface including a sample video having dynamically adjustable brightness characteristics.

In some implementations, the user-specific light response parameter may be determined based on explicit user input. The processor 14 may be configured to present, via the display 34, a filter configuration user interface 86. The filter configuration user interface 86 may be configured to present information relating to different levels and/or types of video brightness and elicit a user to provide user input indicating a preferred brightness level/type. The user input indicating the preferred brightness level/type for the user may be to tune the filter 58 for the user. In essence, the user is specifying how aggressive they want the filter to be. The processor 14 may be configured to determine a user-specific light response parameter based on the brightness preferences provided by the user. FIGS. 7 and 8 show different examples of filter configuration user interfaces that may be presented to a user to elicit user input indicating brightness level/type preferences.

FIG. 7 shows an example graphical user interface 700 including a plurality of sample videos each having a different brightness and/or a different velocity of change in brightness across a plurality of frames of the sample video. In particular, a dimmer sample video 702 has a lower brightness level and/or a lower velocity of change in brightness from frame to frame. A brighter sample video 704 has a higher brightness level and/or a higher velocity of change in brightness from frame to frame. The graphical user interface 700 further includes a request 706 for a user to play the sample videos 702, 704 and select a preferred brightness level and/or a velocity of change in brightness corresponding to the sample videos. The graphical user interface 700 includes selection user interface elements 708, 710 corresponding to the different sample videos. The computing device 10 may be configured to receive user input indicating a user-preferred sample video selected from the plurality of sample videos based on selecting one of the selection user interface elements 708, 710. The processor 14 may be configured to determine the user-specific light response parameter based on the user-preferred sample video. For example, the filter 58 may be tuned to produce a filtered video having similar brightness characteristics as the user-preferred sample video. It will be appreciated that the graphical user interface 700 may include any suitable number of sample videos having any suitable brightness level and/or velocity of change in brightness that may be used to determine a user-specific light response parameter.

FIG. 8 shows another example graphical user interface 800 including a dynamically adjustable sample video 802. In particular, the sample video 802 may have a dynamically adjustable brightness and/or a dynamically adjustable velocity of change in brightness across a plurality of frames of the sample video. The graphical user interface 800 further includes a brightness adjustment user interface element 804 that may be manipulated via user input to dynamically adjust the brightness of the sample video and/or dynamically adjust the velocity of change in brightness across a plurality of frames of the sample video. The brightness adjustment user interface element 804 is depicted as a slider tool that may be slid between varying levels of brightness from dimmer levels to brighter levels. The graphical user interface 800 further includes a request 806 for a user to play the sample video 804 and while the sample video is playing, manipulate the slider such that the video is adjusted to a preferred brightness level and/or a preferred velocity of change in brightness. The computing device 10 may be configured to receive user input indicating a user-preferred brightness level and/or velocity of change in brightness. The processor 14 may be configured to determine the user-specific light response parameter based on the user-preferred brightness level and/or velocity of change in brightness. For example, the filter 58 may be tuned to produce a filtered video having similar brightness characteristics as the user-tuned sample video.

Figure 9:
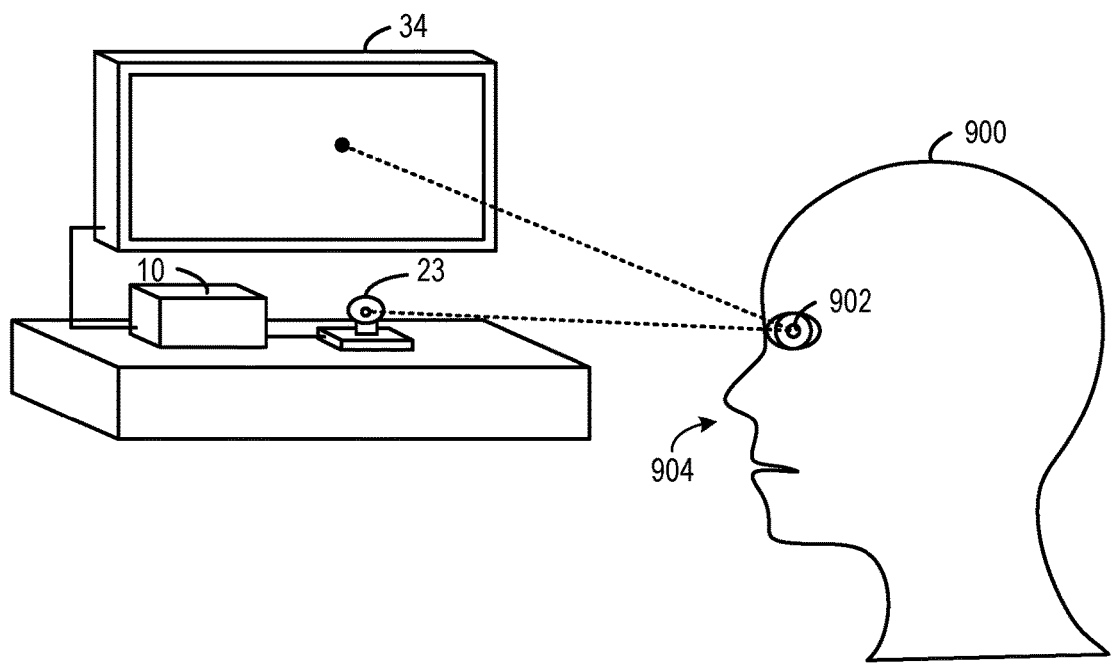
FIG. 9 schematically shows an example scenario of a user being imaged for purposes of determining a user-specific light response parameter.

It will be appreciated that the filter configuration graphical user interface 86 may take any suitable form in order to elicit a user to provide user input from which a user-specific light response parameter and/or other brightness preferences may be determined, in order to provide correspondingly appropriate filter behavior In some implementations, the user-specific light response parameter may be measured or inferred without receiving explicit user input that indicates brightness preferences for a user. In such implementations, the processor 14 may be configured to instantiate a user analysis tool 88 that is configured to analyze user observation information in order to determine a user-specific response parameter for a user. In one example shown in FIG. 9, the camera 23 images a user 900, and more particularly, the user's eye 902. The user analysis tool 88 may be configured to acquire, via the camera 23, a plurality of images of the use's eye 902 and determine the user-specific light response parameter based on the plurality of images of the user's eye. In one example, the plurality of images may depict the user's eye over a period of time, and the user analysis tool 88 may be configured to measure a pupil dilation rate of the user's eye based on the plurality of images. The processor 14 may be configured to generate the filter 58 based on the measured pupil dilation rate of the user's or another user-specific light response parameter derived from the measured pupil dilation rate.

In another example, the user analysis tool 88 may be configured to acquire, via the camera 23, one or more images of the user's face 904 during presentation of video content via the display 34. The user analysis tool 88 may be configured to identify a user-specific brightness reaction to the video content based on the one or more images and infer the user-specific light response parameter based on the user-specific brightness reaction. FIGS. 10A-10D show examples of different brightness reactions of a user from which the user-specific brightness response parameter may be inferred.

Figure 10A:
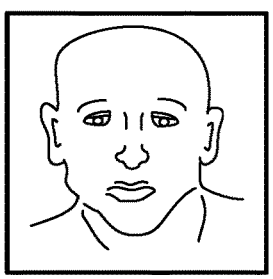
FIGS. 10A-10D show different example user reactions to presentation of video content having different brightness characteristics.

In FIG. 10A, the image of the user's face shows that the user's eyes are open to a normal degree and the user has no significant facial reaction. From this reaction, the user analysis tool 88 may infer that the user is not sensitive to the brightness of the presented video and thus video does not need to be filtered to reduce a level of brightness and/or a velocity of change in brightness.

Figure 10B:
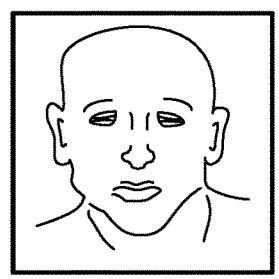

In FIG. 10B, the image of the user's face shows that the user is squinting with the user's eye closed to a degree. From this reaction, the user analysis tool 88 may infer that the user is at least somewhat sensitive to the brightness of the presented video and thus video needs to be filtered to reduce a level of brightness and/or a velocity of change in brightness.

Figure 10C:
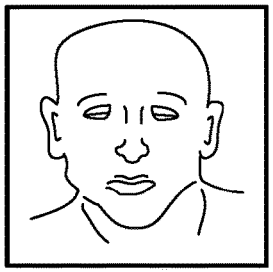

In FIG. 10C, the image of the user's face shows that the user's eyes are fully closed. From this reaction, the user analysis tool 88 may infer that the user is overwhelmed by the level of brightness and thus video needs to be filtered to reduce a level of brightness and/or a velocity of change in brightness. In some examples, the user reaction depicted in the image shown in FIG. 10C may cause the filter to be tuned more aggressively than the tuning of the filter based on the user reaction depicted in the image shown in FIG. 10B.

Figure 10D:
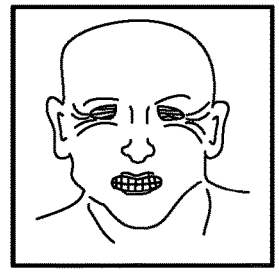

In FIG. 10D, the image of the user's face shows that the user's eyes are fully closed, and the user is wincing and bearing his teeth. From this reaction, the user analysis tool 88 may infer that the user is in severe discomfort based on the level of brightness and thus video needs to be filtered to reduce a level of brightness and/or a velocity of change in brightness. In some examples, the user reaction depicted in the image shown in FIG. 10D may cause the filter to be tuned more aggressively than the tuning of the filters based on the user reactions depicted in the images shown in FIGS. 10B and 10C.

The user analysis tool 88 may employ any suitable facial recognition technology to infer the user-specific brightness response parameter from images of a user. In some implementations, the user analysis tool 88 may include a previously-trained machine learning model that is configured to output different user-specific brightness response parameter values based on different observed user behaviors, such as pupil dilation rate and/or brightness reactions of users.

In some implementations, the user analysis tool 88 may infer the user-specific brightness response parameter based on observed user behavior. In one example, the user analysis tool 88 may be configured to recognize when a user repeatedly pauses display of a video or turns off the video before completion. The user analysis tool 88 may infer that the user is experiencing discomfort due to brightness and adjusts the users-specific brightness parameter to reduce a level of brightness and/or a velocity of change in brightness. In another example, the user analysis tool 88 may be configured to recognize when a user repeatedly adjusts a brightness setting of the display (e.g., reduces the brightness), and adjusts the users-specific brightness parameter to reduce a level of brightness and/or a velocity of change in brightness.

It will be appreciated that the user-specific light response parameter may be determined on a repeated basis so as to dynamically update generation of the filter. The user-specific light response parameter may be determined repeatedly according to any suitable frequency and/or period. For example, the user-specific light response parameter may be repeatedly determined on a weekly, monthly, or yearly basis.

As discussed above, in some cases, a user may have brightness sensitivity for a particular color of light. Accordingly, in some implementations, the filter 58 may be configured to perform color-specific filtering to mitigate color-specific high brightness conditions in frames 42 of the video 40.

In some implementations, the filter 58 may be configured to reduce brightness of a specific color of the frame 42 without affecting the brightness of other colors of the frame 42. In one example shown in FIG. 11, the filter 58 is configured to mitigate a high brightness condition in the red color channel of the frame 42. The processor 14 may be configured to separate the frame 42 into a plurality of separate color channels (e.g., red, green, and blue color channels). The processor 14 may be configured to determine a color-specific brightness characterization 52R for at least the selected color-channel—i.e., the red color channel, of the plurality of color channels of the frame 42. In the depicted example, the processor 14 also determines a green channel brightness characterization 52G, and a blue channel brightness characterization 52B. In other examples, only the color-specific brightness characterization for the selected color channel may be determined by the processor 14. Furthermore, the processor 14 may be configured to, for the selected color channel—i.e., the red color channel, determine one or more additional color-specific brightness characterizations (not shown) of one or more additional frames (e.g., preceding, following).

The processor 14 may be configured to generate a filter 58 for the frame 42 based on the red channel brightness characterization for the frame and the one or more additional red channel brightness characterizations for the one or more additional frames. In the depicted example, the filter 58 is a multi-stage filter including an IIR filter 1100 and a sigmoid filter 1102. The IIR filter 1100 is tuned based on at least the red channel brightness characterizations for the frame and the one or more additional frames. The IIR filter 1100 may be configured to determine a red channel threshold brightness for the frame 42 and shift pixels having red channel brightness greater than the red channel threshold brightness to be less than or equal to the red channel threshold brightness. Furthermore, the red channel threshold brightness may be provided as input to the sigmoid filter 1102. For example, the red channel threshold brightness may set the upper bound of a sigmoid curve of the sigmoid filter 1102. The sigmoid filter 1102 may be applied to the frame to smooth the brightness values of the red channel of the frame.

The processor 14 may be configured to apply the filter 58 to the frame 42 to generate a filtered frame 72 that is output by the processor 14. In the depicted example, the color-specific filter removes the color-specific high brightness condition for the red color channel from the frame such that it is not present in the filtered frame. Since the filter is only applied to the red color channel the brightness of the other color channels is not affected.

It will be appreciated that the processor 14 may be configured to generate a color-specific filter for any suitable selected color. In some implementations, separate filters may be generated and applied to a plurality of color channels. As an example, separate filters may be generated for the green color channel and the blue color channel.

In some cases, a user may have both a sensitivity to overall brightness and a sensitivity to brightness in a particular color. Accordingly, in some implementations, the filter 58 may be configured to perform color-specific filtering to mitigate color-specific high brightness conditions and overall high brightness conditions in frames 42 of the video 40. In one example shown in FIG. 12, the filter 58 is configured to mitigate a high brightness condition in the red color channel of the frame 42 as well as an overall high brightness condition of the frame 42. The processor 14 may be configured to separate the frame 42 into a plurality of separate color channels (e.g., red, green, and blue color channels). The processor 14 may be configured to determine a color-specific brightness characterization 52R for at least the selected color-channel—i.e., the red color channel (a green channel brightness characterization 52G, and a blue channel brightness characterization 52). Additionally, the processor 14 may be configured to determine an overall brightness characterization 52 for the frame 42 that takes into account brightness data for all of the color channels of the frame 42.

Furthermore, the processor 14 may be configured to determine one or more additional color-specific brightness characterizations (not shown) and overall brightness characterizations (not shown) of one or more additional frames (e.g., preceding, following). The processor 14 may be configured to generate a filter 58 for the frame 42 based on the red channel brightness characterization for the frame, the one or more additional red channel brightness characterizations for the one or more additional frames, the overall brightness characterization for the frame, and the one or more additional overall brightness characterizations for the one or more additional frames. In the depicted example, the filter 58 is a multi-stage filter including a first IIR filter 1200, a second IIR filter 1202, and a sigmoid filter 1204. The first IIR filter 1200 is tuned based on the red channel brightness characterizations for the frame and the one or more additional frames. The first IIR filter 1200 may be configured to determine a red channel brightness threshold for the frame 42. The second IIR filter 1202 may be tuned based on the overall brightness characterization of the frame and the one or more additional frames. The second IIR filter 1202 may be configured to determine an overall threshold brightness for the frame 42. Furthermore, the red channel threshold brightness and the overall threshold brightness output from the first and second IIR filters 1200, 1202 may be provided as input to the sigmoid filter 1204. The sigmoid filter 1204 may be applied to the frame to shift pixels having overall brightness and red channel brightness greater than respective threshold brightnesses to be less than the respective threshold brightnesses. Further, the sigmoid filter 1204 is configured to smooth the overall brightness values of the frame as well as additionally mediate the brightness values of the red channel of the frame. The processor 14 may be configured to apply the filter 58 to the frame to generate a filtered frame 72 that is output by the processor 14. In the depicted example, the filter removes the high brightness condition from the frame such that it is not present in the filtered frame. Additionally, the filter provides additional dampening of brightness in the red color channel beyond the dampening provided by the filtering of the overall brightness.

Although the above described examples discuss the color-specific filters being applied to an entire frame, it will be appreciated that such filters may be applied to particular regions of interest within a frame to mitigate a color-specific high brightness condition in the region of interest, such as a color-specific point light source.

Figure 13:
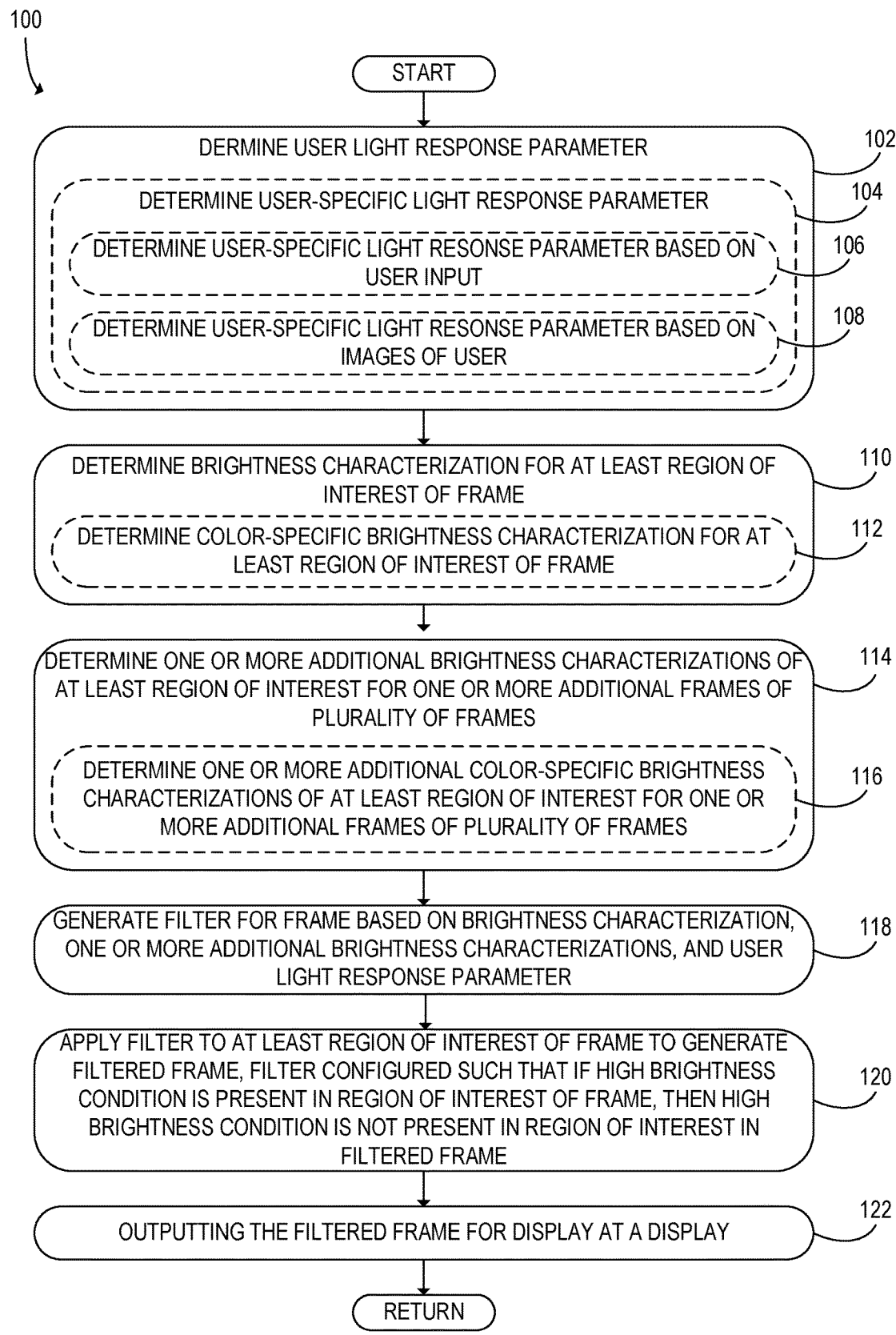
FIG. 13 shows a flowchart of method for adjusting brightness of a video with a computing device.

FIG. 13 shows a flowchart of a method 100 for use with a computing device. The method 100 may be used with the computing device 10 of FIG. 1, or alternatively with some other computing device. The steps of the method 100 may be performed for each frame of a plurality of frames included in a video. The plurality of frames may include the entire video or alternatively only a subset of the frames of the video.

At 102, the method 100 includes determining a user light response parameter. In one example, the user light response parameter is a pupil dilation rate. In some implementations, the user light response parameter may be a static parameter that is determined a priori. In some implementations, at 104, the method 100 optionally may include determining a user-specific light response parameter. In some such implementations, at 106, the method 100 optionally may include determining the user-specific light response parameter based on user input. For example, the user-specific light response parameter may be determined based on a sample video having preferred brightness characteristics that is selected by a user, such as the example scenarios discussed with reference to FIGS. 7 and 8. In some implementations, at 108, the method 100 optionally may include determining the user-specific light response parameter based on one or more images of a user. In one example, a user's pupil dilation response to light may be measured from images of a user's eye, such as the example scenario discussed with reference to FIG. 9. In another example, the user-specific light response parameter may be determined based on inferred reactions of a user while video content is being presented, such as the example scenarios discussed in FIGS. 10A-10D.

At 110, the method 100 includes determining a brightness characterization of at least a region of interest in the frame. The region of interest may include the entire frame or alternatively only a subset of the frame. In some implementations, the brightness characterization of at least the region of interest in the frame may be a brightness distribution including, for each of a plurality of brightness ranges, a number of pixels in the region of interest having brightness within that brightness range. In such implementations, the brightness characterization may include a brightness range for each possible brightness a pixel may have. Alternatively, pixels of similar brightness may be binned into a brightness range. In other implementations, the brightness characterization may be an average brightness, which may be a mean brightness or a median brightness, over the region of interest. In some implementations, at 112, the method optionally may include determining a color-specific brightness characterization for at least the region of interest of the frame.

At 114, the method 100 includes determining one or more additional brightness characterizations of at least the region of interest in one or more additional frames of the plurality of frames. For example, the one or more additional frames may include one or more preceding frames immediately preceding the frame in the video and/or one or more following frames immediately following the frame in the video. In some implementations, at 116, the method 100 optionally may include determining one or more additional color-specific brightness characterizations of at least the region of interest in one or more additional frames of the plurality of frames.

At 118, the method 100 includes generating a filter for the frame based on the brightness characterization, the one or more additional brightness characterizations, and the user light response parameter. In some implementations, the filter may include an infinite impulse response filter. In some implementations, the filter may include a finite impulse response filter. The filter may be configured such that if the frame includes a high brightness condition, then the filter removes the high brightness condition from the frame.

At 120, the method 100 includes applying the filter to at least the region of interest in the frame to generate a filtered frame. The high brightness condition may not be present in the region of interest in the filtered frame. For example, the region of interest in the filtered frame may include a number of pixels lower than the threshold number of pixels that exceed the brightness threshold. In other implementations, the average brightness of the region of interest may below the average brightness threshold. In some implementations, the filter may be nonuniform over the region of interest rather than modifying the brightness of each pixel in the region of interest by the same amount.

As discussed above, the filter may be generated based on a brightness change threshold in addition to, or alternatively to, the threshold brightness. In such implementations, for a number of filtered pixels in the region of interest in the filtered frame less than the threshold number of pixels, a respective filtered brightness may differ by an amount greater than the brightness change threshold from the brightness of that pixel in a preceding frame and/or a following frame.

At 122, the method 100 further includes outputting the filtered frame. In some examples, the filtered frame may be output for display at a display. The display may be included in the computing device at which the method 100 is performed or may be communicatively coupled with the computing device via one or more communication devices. In some examples, the filtered frame may be output to a video file that is stored in the memory 12 of the computing device. In some examples, the filtered frame may be output to another component of the computing device for additional video processing.

The method 100 may be repeatedly performed for at least the region of interest of each frame of a plurality of frames of the video. One or more respective additional filters may be generated in one or more other iterations of the above steps each time the method 100 is performed on a frame. The one or more respective additional filters may differ from the filter generated for the frame. Thus, the amount of filtering applied to at least the region of interest of each frame may vary over the plurality of frames for which filtering is performed.

In some implementations, the methods and processes described herein may be tied to a computing system of one or more computing devices. In particular, such methods and processes may be implemented as a computer-application program or service, an application-programming interface (API), a library, and/or other computer-program product.

Figure 14:
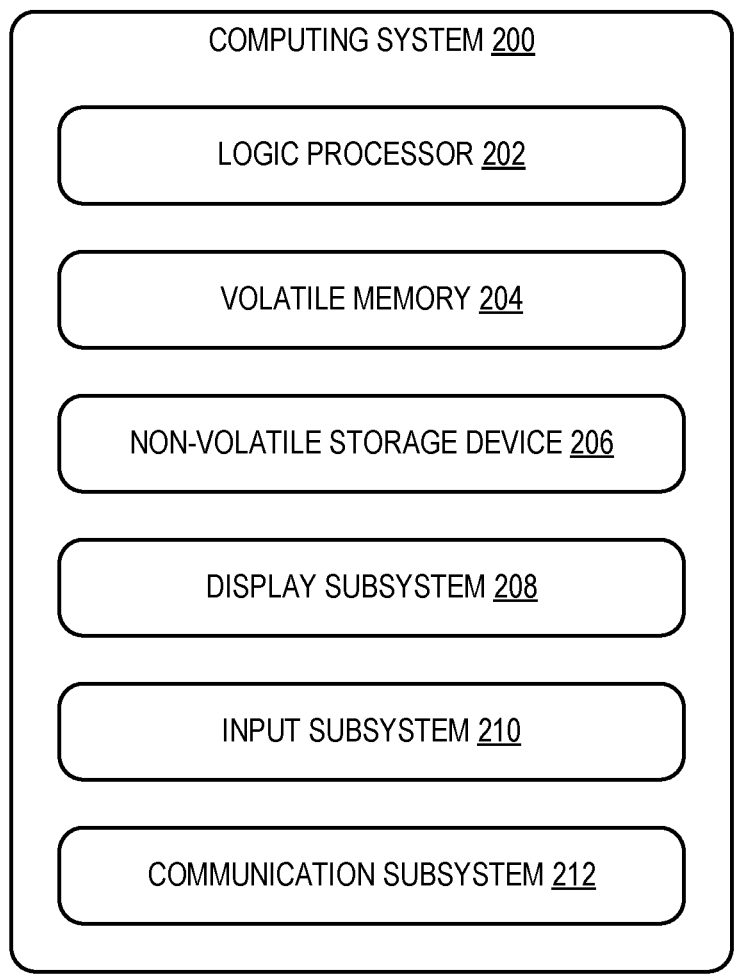
FIG. 14 schematically shows an example computing system.

FIG. 14 schematically shows a non-limiting implementation of a computing system 200 that can enact one or more of the methods and processes described above. Computing system 200 is shown in simplified form. Computing system 200 may embody the computer device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 14.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 200 to send and/or receive messages to and/or from other devices via a network such as the Internet.

In an example, a computing device comprises a processor, and a data storage device holding instructions executable by the processor to determine a user-specific light response parameter, for each frame of a plurality of frames included in a video, determine a brightness characterization for at least a region of interest in the frame, determine one or more additional brightness characterizations for at least the region of interest in one or more additional frames of the plurality of frames, generate a filter for the frame based on the brightness characterization, the one or more additional brightness characterizations, and the user-specific light response parameter, apply the filter to at least the region of interest in the frame to generate a filtered frame, wherein the filter is configured such that if a high brightness condition is present in the region of interest in the frame, then the high brightness condition is not present in the region of interest in the filtered frame, and output the filtered frame. In this example and/or other examples, the user-specific light response parameter may be a user-specific pupil response to light. In this example and/or other examples, the user-specific pupil response to light may be a pupil dilation rate. In this example and/or other examples, the user-specific light response parameter may be determined based on explicit user input. In this example and/or other examples, the computing device may further comprise a display, and the data storage device may hold instructions executable by the processor to present, via the display, a plurality of sample videos, each sample video having a different brightness and/or a different velocity of change in brightness across a plurality of frames of the sample video, and receive user input indicating a user-preferred sample video selected from the plurality of sample videos, and the user-specific light response parameter may be determined based on the user-preferred sample video. In this example and/or other examples, the computing device may further comprise a display, and the data storage device may hold instructions executable by the processor to present, via the display, a graphical user interface including a sample video and a brightness adjustment user interface element configured to adjust a velocity of change in brightness across a plurality of frames of the sample video, and receive user input that adjusts the brightness adjustment user interface element to a desired velocity of change in brightness across the plurality of frames of the sample video, and the user-specific light response parameter may be determined based on the desired velocity of change in brightness across the plurality of frames of the sample video. In this example and/or other examples, the computing device may further comprise a camera, and the data storage device may hold instructions executable by the processor to acquire, via the camera, a plurality of images of a user eye, and determine a pupil response of the user eye based on the plurality of images, and wherein the user-specific light response parameter is determined based on the pupil response of the user eye. In this example and/or other examples, the computing device may further comprise a display and a camera, and the data storage device may hold instructions executable by the processor to acquire, via the camera, one or more images of a user face during presentation of video content via the display, and identify a user-specific brightness reaction to the video content based on the one or more images, and wherein the user-specific light response parameter is determined based on the user-specific brightness reaction. In this example and/or other examples, the user-specific light response parameter may be determined on a repeated basis so as to dynamically update generation of the filter. In this example and/or other examples, the filter may include an infinite impulse response filter characterized by a difference equation, and terms of the difference equation may be determined based on the brightness characterization, the one or more additional brightness characterizations, and the user-specific light response parameter. In this example and/or other examples, the high brightness condition may be a condition in which each of a plurality of pixels in the region of interest exceeding a threshold number of pixels has a respective brightness exceeding a threshold brightness. In this example and/or other examples, the threshold brightness may be a lower of a static threshold brightness and a dynamic threshold brightness. In this example and/or other examples, the filter may be configured to apply a sigmoid function having an upper bound corresponding to the threshold brightness. In this example and/or other examples, the region of interest may be one of a plurality of regions included in the frame, and a different filter may be generated and applied to each region of the plurality of regions to generate the filtered frame.

In an example, a method for adjusting brightness of a video with a computing device comprises determining a user-specific light response parameter, for each frame of a plurality of frames included in the video determining a brightness characterization for at least a region of interest in the frame, determining one or more additional brightness characterizations for at least the region of interest in one or more additional frames of the plurality of frames, generating a filter for the frame based on the brightness characterization, the one or more additional brightness characterizations, and the user-specific light response parameter, applying the filter to at least the region of interest in the frame to generate a filtered frame, wherein the filter is configured such that if a high brightness condition is present in the region of interest in the frame, then the high brightness condition is not present in the region of interest in the filtered frame, and outputting the filtered frame. In this example and/or other examples, the method may further comprise presenting, via a display of the computing device, a plurality of sample videos, each sample video having a different brightness and/or a different velocity of change in brightness across a plurality of frames of the sample video, and receiving user input indicating a user-preferred sample video selected from the plurality of sample video, and wherein the user-specific light response parameter is determined based on the user-preferred sample video. In this example and/or other examples, the method may further comprise presenting, via a display of the computing device, a graphical user interface including a sample video and a brightness adjustment user interface element configured to adjust a velocity of change in brightness across a plurality of frames of the sample video, and receiving user input that adjusts the brightness adjustment user interface element to a desired velocity of change in brightness across the plurality of frames of the sample video, and wherein the user-specific light response parameter is determined based on the desired velocity of change in brightness across the plurality of frames of the sample video. In this example and/or other examples, the method may further comprise acquiring, via a camera of the computing device, a plurality of images of a user eye, and determining a pupil response of the user eye based on the plurality of images, and wherein the user-specific light response parameter is determined based on the pupil response of the user eye. In this example and/or other examples, the method may further comprise acquiring, via the camera, one or more images of a user face during presentation of video content via the display; and identifying a user-specific brightness reaction to the video content based on the one or more images, and wherein the user-specific light response parameter is determined based on the user-specific brightness reaction.

In an example, a computing device comprises a processor, and a data storage device holding instructions executable by the processor to determine a user-specific light response parameter, for each frame of a plurality of frames included in a video determine a brightness characterization for at least a region of interest in the frame, determine one or more additional brightness characterizations for at least the region of interest for at least a preceding frame of the plurality of frames, generate a filter for the frame based on the brightness characterization, the one or more additional brightness characterizations, and the user-specific light response parameter, apply the filter to at least the region of interest in the frame to generate a filtered frame, wherein the filter is configured such that if a high brightness condition is present in the region of interest in the frame, then the high brightness condition is not present in the region of interest in the filtered frame, and wherein the high brightness condition includes an increase in an average brightness of the region of interest relative to a preceding brightness of the region of interest in the preceding frame exceeding a brightness change threshold, and output the filtered frame.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor; and
a data storage device holding instructions executable by the processor to:
determine a user-specific light response parameter corresponding to a user's specific response to light being directed to the user's eye;
for each frame of a plurality of frames included in a video:
determine a brightness characterization for at least a region of interest in the frame;
determine one or more additional brightness characterizations for at least the region of interest in one or more additional frames of the plurality of frames;
generate a filter for the frame based on the brightness characterization, the one or more additional brightness characterizations, and the user-specific light response parameter;
apply the filter to at least the region of interest in the frame to generate a filtered frame, wherein the filter is configured such that if a high brightness condition is present in the region of interest in the frame, then the filter reduces a change in brightness in the region of interest over a subsequent sequence of filtered frames in the video; and
output the filtered frame.

2. The computing device of claim 1, wherein the user-specific light response parameter is a user-specific pupil response to light being directed to the user's eye.

3. The computing device of claim 2, wherein the user-specific pupil response to light is a pupil dilation rate.

4. The computing device of claim 1, wherein the user-specific light response parameter is determined based on explicit user input indicating the user's specific response to light being directed to the user's eye.

5. The computing device, of claim 4, further comprising a display, and wherein the data storage device holds instructions executable by the processor to:
present, via the display, a plurality of sample videos, each sample video having a different brightness and/or a different velocity of change in brightness across a plurality of frames of the sample video; and
receive user input indicating a user-preferred sample video selected from the plurality of sample videos, and wherein the user-specific light response parameter is determined based on the user-preferred sample video.

6. The computing device, of claim 4, further comprising a display, and wherein the data storage device holds instructions executable by the processor to:
present, via the display, a graphical user interface including a sample video and a brightness adjustment user interface element configured to adjust a velocity of change in brightness across a plurality of frames of the sample video; and
receive user input that adjusts the brightness adjustment user interface element to a desired velocity of change in brightness across the plurality of frames of the sample video, and wherein the user-specific light response parameter is determined based on the desired velocity of change in brightness across the plurality of frames of the sample video.

7. The computing device, of claim 1, further comprising a camera, and wherein the data storage device holds instructions executable by the processor to:
acquire, via the camera, a plurality of images of a user's eye while light is being directed to the user's eye; and
determine a pupil response of the user's eye to light being directed to the user's eye based on the plurality of images, and wherein the user-specific light response parameter is determined based on the pupil response of the user's eye light being directed to the user's eye.

8. The computing device, of claim 1, further comprising a display and a camera, and wherein the data storage device holds instructions executable by the processor to:
acquire, via the camera, one or more images of a user face during presentation of video content via the display; and
identify a user-specific brightness reaction to the video content based on the one or more images, and wherein the user-specific light response parameter is determined based on the user-specific brightness reaction.

9. The computing device of claim 1, wherein the user-specific light response parameter is determined on a repeated basis so as to dynamically update generation of the filter.

10. The computing device of claim 1, wherein the filter includes an infinite impulse response filter characterized by a difference equation, and wherein terms of the difference equation are determined based on the brightness characterization, the one or more additional brightness characterizations, and the user-specific light response parameter.

11. The computing device of claim 1, wherein the high brightness condition is a condition in which each of a plurality of pixels in the region of interest exceeding a threshold number of pixels has a respective brightness exceeding a threshold brightness.

12. The computing device of claim 11, wherein the threshold brightness is a lower of a static threshold brightness and a dynamic threshold brightness.

13. The computing device of claim 12, wherein the filter is configured to apply a sigmoid function having an upper bound corresponding to the threshold brightness.

14. The computing device of claim 1, wherein the region of interest is one of a plurality of regions included in the frame, wherein a different filter is generated and applied to each region of the plurality of regions to generate the filtered frame.

15. A method for adjusting brightness of a video with a computing device, the method comprising:
determining a user-specific light response parameter corresponding to a user's specific response to light being directed to the user's eye;
for each frame of a plurality of frames included in the video:
determining a brightness characterization for at least a region of interest in the frame;
determining one or more additional brightness characterizations for at least the region of interest in one or more additional frames of the plurality of frames;
generating a filter for the frame based on the brightness characterization, the one or more additional brightness characterizations, and the user-specific light response parameter;
applying the filter to at least the region of interest in the frame to generate a filtered frame, wherein the filter is configured such that if a high brightness condition is present in the region of interest in the frame, then the filter reduces a change in brightness in the region of interest over a subsequent sequence of filtered frames in the video; and
outputting the filtered frame.

16. The method of claim 15, further comprising:
presenting, via a display of the computing device, a plurality of sample videos, each sample video having a different brightness and/or a different velocity of change in brightness across a plurality of frames of the sample video; and
receiving user input indicating a user-preferred sample video selected from the plurality of sample video, and wherein the user-specific light response parameter is determined based on the user-preferred sample video.

17. The method of claim 15, further comprising:
presenting, via a display of the computing device, a graphical user interface including a sample video and a brightness adjustment user interface element configured to adjust a velocity of change in brightness across a plurality of frames of the sample video; and
receiving user input that adjusts the brightness adjustment user interface element to a desired velocity of change in brightness across the plurality of frames of the sample video, and wherein the user-specific light response parameter is determined based on the desired velocity of change in brightness across the plurality of frames of the sample video.

18. The method of claim 15, further comprising:
acquiring, via a camera of the computing device, a plurality of images of a user's eye while light is being directed to the user's eye; and
determining a pupil response of the user's eye to light being directed to the user's eye based on the plurality of images, and wherein the user-specific light response parameter is determined based on the pupil response of the user's eye light being directed to the user's eye.

19. The method of claim 15, further comprising:

acquiring, via the camera, one or more images of a user face during presentation of video content via the display; and identifying a user-specific brightness reaction to the video content based on the one or more images, and wherein the user-specific light response parameter is determined based on the user-specific brightness reaction.

20. A computing device comprising:

a processor; and a data storage device holding instructions executable by the processor to:

determine a user-specific light response parameter corresponding to a user's specific response to light being directed to the user's eye;

for each frame of a plurality of frames included in a video:

determine a brightness characterization for at least a region of interest in the frame;

determine one or more additional brightness characterizations for at least the region of interest for at least a preceding frame of the plurality of frames;

generate a filter for the frame based on the brightness characterization, the one or more additional brightness characterizations, and the user-specific light response parameter;

apply the filter to at least the region of interest in the frame to generate a filtered frame, wherein the filter is configured such that if a high brightness condition is present in the region of interest in the frame, then the high brightness condition is not present in the region of interest in the filtered frame, and wherein the high brightness condition includes an increase in an average brightness of the region of interest relative to a preceding brightness of the region of interest in the preceding frame exceeding a brightness change threshold; and output the filtered frame.

* * * * *